(12) United States Patent
Bodewes

(10) Patent No.: US 9,698,715 B2
(45) Date of Patent: Jul. 4, 2017

(54) GENERATING AUXILIARY POWER FOR A WIND TURBINE

(75) Inventor: Florentius Johannes Bodewes, Hilversum (NL)

(73) Assignee: XEMC DARWIND B.V., Hilversum (NL)

( * ) Notice: Subject to any disclaimer, the term of this patent is extended or adjusted under 35 U.S.C. 154(b) by 131 days.

(21) Appl. No.: 14/342,692

(22) PCT Filed: Sep. 5, 2012

(86) PCT No.: PCT/EP2012/067351
§ 371 (c)(1),
(2), (4) Date: Apr. 18, 2014

(87) PCT Pub. No.: WO2013/034610
PCT Pub. Date: Mar. 14, 2013

(65) Prior Publication Data
US 2014/0225369 A1   Aug. 14, 2014

(30) Foreign Application Priority Data

Sep. 5, 2011   (EP) .................................. 11180081

(51) Int. Cl.
*F03D 9/00* (2016.01)
*H02P 9/04* (2006.01)
(Continued)

(52) U.S. Cl.
CPC ................. *H02P 9/00* (2013.01); *F03D 7/04* (2013.01); *F03D 9/11* (2016.05); *H02P 2101/15* (2015.01); *Y02E 10/723* (2013.01)

(58) Field of Classification Search
CPC .......... H02P 9/00; H02P 2101/15; F03D 9/11; F03D 7/04; Y02E 10/723; Y10T 307/582; Y10T 307/707
(Continued)

(56) References Cited

U.S. PATENT DOCUMENTS 3,996,508 A * 12/1976 Board ........................... 323/277
4,551,699 A * 11/1985 de Jong et al. ............... 336/135
(Continued)

FOREIGN PATENT DOCUMENTS

| EP | 1903213 | 3/2008 |
|---|---|---|
| EP | 2236821 | 10/2010 |
| WO | 2008006020 | 1/2008 |

OTHER PUBLICATIONS

Search Report and Written Opinion of corresponding PCT/EP2012/067351 filed Sep. 5, 2012.

*Primary Examiner* — Tulsidas C Patel
*Assistant Examiner* — Thomas Quigley
(74) *Attorney, Agent, or Firm* — Steven M. Koehler; Westman, Champlin & Koehler, P.A.

(57) ABSTRACT

A method and a system for generating auxiliary power for an islanded wind turbine are described, wherein the wind turbine may comprise a generator configured to provide power to a main grid. The method comprises: detecting an island mode of operation wherein said wind turbine is electrically disconnected from said main grid; in response to said disconnection, adjusting the rotational speed of said wind turbine to a value within a range of low rotational speeds; converting said generator output to a value suitable for charging said auxiliary power distribution system; and, connecting the output of said converter to said auxiliary power distribution system.

18 Claims, 7 Drawing Sheets

(51) Int. Cl.
*H02P 9/00* (2006.01)
*F03D 7/04* (2006.01)
*F03D 9/11* (2016.01)
*H02P 101/15* (2016.01)

(58) Field of Classification Search
USPC .................................................. 290/44, 55
See application file for complete search history.

(56) References Cited

U.S. PATENT DOCUMENTS

| | | | |
|---|---|---|---|
| 5,909,098 A * | 6/1999 | Konecny et al. | 318/811 |
| 8,841,796 B2 * | 9/2014 | Rosenvard | 307/40 |
| 2004/0145188 A1 | 7/2004 | Janssen | |
| 2008/0030027 A1 | 2/2008 | Erdman | |
| 2008/0067872 A1 * | 3/2008 | Moth | 307/66 |
| 2008/0069692 A1 * | 3/2008 | Oohara et al. | 416/31 |
| 2009/0230689 A1 * | 9/2009 | Burra | F03D 9/003 |
| | | | 290/55 |
| 2010/0060000 A1 * | 3/2010 | Scholte-Wassink | 290/44 |
| 2011/0050377 A1 * | 3/2011 | Bjerknes et al. | 336/120 |
| 2012/0146423 A1 * | 6/2012 | Bodewes et al. | 307/84 |

* cited by examiner

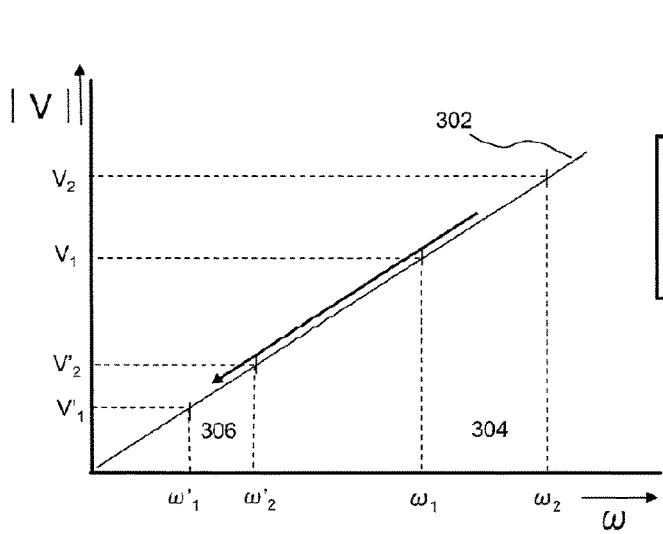 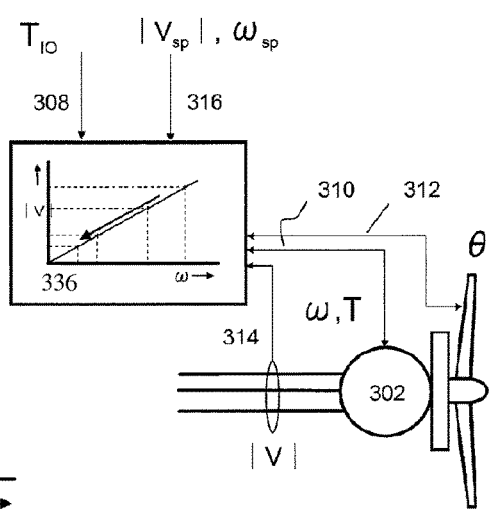
Fig. 3A
Fig. 3B

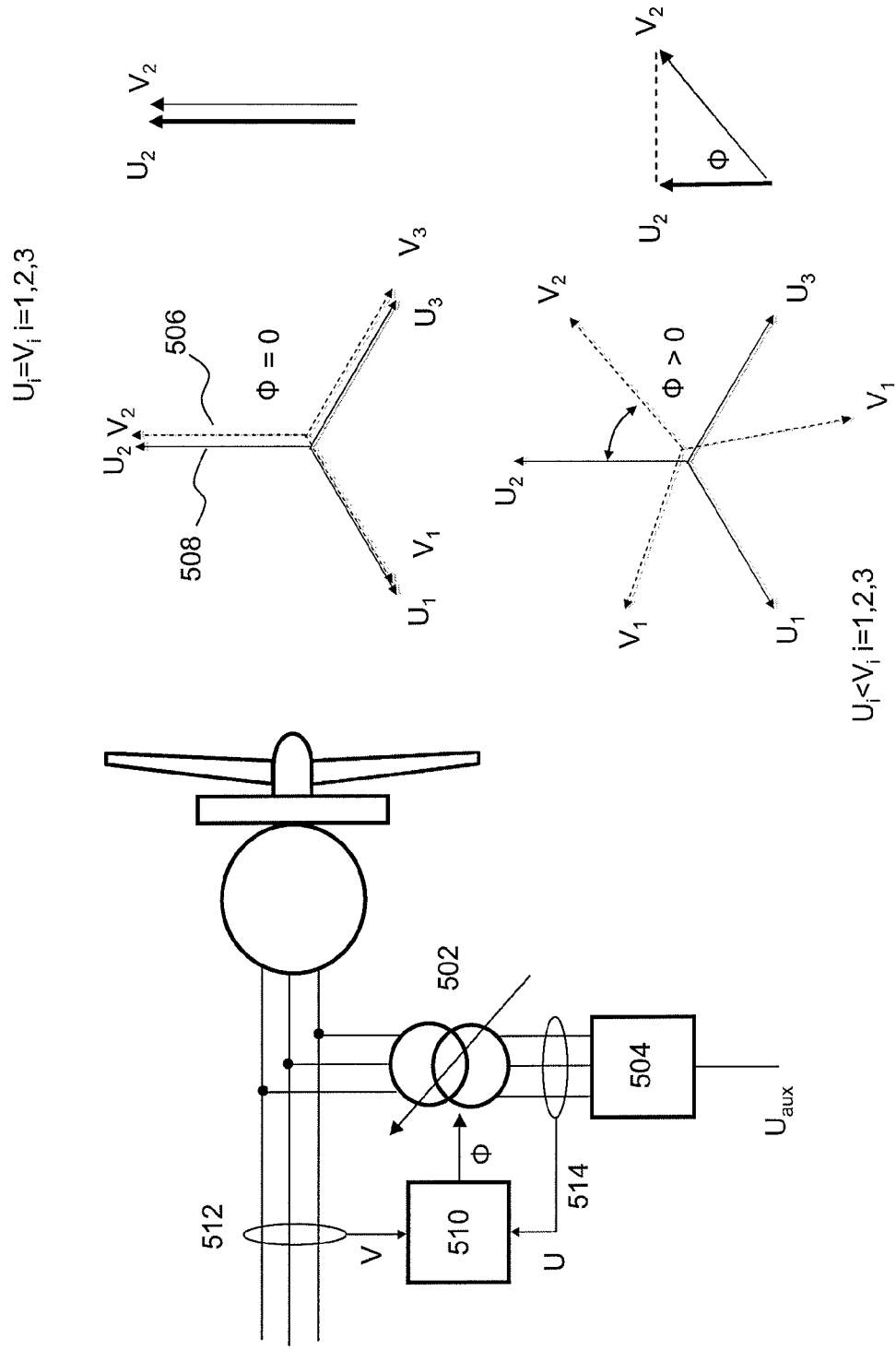

GENERATING AUXILIARY POWER FOR A WIND TURBINE

CROSS-REFERENCE TO RELATED APPLICATION

This application is a Section 371 National Stage Application of International Application PCT/EP2012/067351 filed Sep. 5, 2012 and published as WO 2013/034610 A2 in English.

BACKGROUND

The discussion below is merely provided for general background information and is not intended to be used as an aid in determining the scope of the claimed subject matter.

Aspects of the invention relate to generating auxiliary power for a wind turbine and, in particular, though not exclusively, to a method for generating auxiliary power for a wind turbine, a wind turbine comprising an auxiliary power supply, a controller and a converter for use in such wind turbine and a computer program product using such method.

Wind turbine technology and in particular offshore wind turbine technology is a rapidly developing field of technology. At offshore locations higher wind speeds are available and installation of larger size wind turbines are possible when compared with the onshore systems. The installation and operations of such wind parks provide some technological challenges. The wind turbines are floating or installed on a submarine foundation and are electrically interconnected with submarine power cables. Moreover, such wind parks are typically installed in relatively remote areas, hence the control system of the wind farm and/or the control system in each wind turbine of the wind farm should be able to take measure when problems occur during operation. In such circumstances, the wind turbines in a wind park should be configured to autonomously deal with problems arising during the operation of the wind turbine.

One of the problems is that a wind farm or part of the wind turbines of the wind farm may become disconnected from the electrical grid, e.g. because of planned switching action, protective switching of a circuit breaker in the grid or protective switching of a circuit breaker because of an internal wind turbine failure such as a (partial) failure of the (main) converter.

After detection of a such failure circuit breakers may automatically disconnect a turbine from the grid and sets itself to a parking or standby state by stopping rotation of the blades and by pitching the blades in the vane position. Such standby state will last until the disconnected wind turbines can be reconnected to the grid. During the standby state, the wind turbine controller and other turbine components, e.g. the environmental controller, which controls the environmental parameters (temperature, humidity, etc.) of the wind turbine installation to stay within the requested limits, have to be supplied with power from an auxiliary power source, since the power from the grid is not available.

Moreover, there are also other situations possible, e.g. an internal failure of some elements in the wind turbine, wherein a turbine is not physically disconnected from the grid but still requires power from an auxiliary power supply.

A conventional wind turbine typically uses an uninterruptible power supply (comprising e.g. a battery system, super capacitors, a diesel generator set or combinations thereof) as the auxiliary power source. Diesel generators however require maintenance and refueling and are thus less suitable for use in offshore and/or remote wind farm systems. Moreover, batteries are sensitive to temperature changes and—in order to ensure a power supply over a long duration—typically a large number of batteries is required. Moreover, over time the capacity of the batteries may degrade.

From the above it follows that in order for a wind turbine to autonomously deal with problems arising during the operation a reliable auxiliary power source is required which is capable of delivering power to a wind turbine for a relatively long period of time. Hence, there is a need in the prior art for methods and systems for improved ways of generating auxiliary power for use in a wind turbine.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is to reduce or eliminate at least one of the drawbacks known in the prior art and to provide a method of generating auxiliary power for a wind turbine, said wind turbine comprising a generator configured to provide power to a power transmission system, preferably said generator being a permanent magnet (PM) type generator or a synchronous type generator, said method comprising: an auxiliary converter connected, preferably directly connected, to the output of the generator converting at least part of the power output generated by the generator of said wind turbine; and, supplying said converted power to an auxiliary power distribution system connected to at least one uninterruptable power supply.

The invention may also relate to a method of generating auxiliary power for a wind turbine, said wind turbine comprising a generator, a main converter and an auxiliary converter, wherein said generator is configured to provide power via said main converter to a power transmission system, said method comprising: said auxiliary converter being connected to the power output of said generator converting at least part of the power generated by said generator; supplying the power converted by said auxiliary converter to an auxiliary power distribution system of the wind turbine, wherein said auxiliary power system is connected to at least one uninterruptable power supply.

Hence, an auxiliary converter connected to the generator may form an auxiliary power supply for the auxiliary power distribution system of the wind turbine. This way operation of a reliable auxiliary power supply is realized which is capable of delivering power to a wind turbine for a relatively long period of time.

In an embodiment said generator may be configured as a permanent magnet (PM) type generator or as a synchronous type generator.

In an embodiment said auxiliary converter may comprise at least one transformer and an inverter and wherein the output of the converter is connected to a dc node of said uninterruptable power supply.

In an embodiment said auxiliary converter may comprise at least one transformer and an ac/ac converter and wherein the output of said auxiliary converter connected to an ac output of the uninterruptable power supply.

In another embodiment the method may further comprise adjusting the rotational speed of said wind turbine to a value of low rotational speed; converting said generator output to a value suitable for charging said auxiliary power distribution system In a further embodiment the method may further comprise: detecting islanding operation wherein said wind turbine is electrically disconnected from said power transmission system; in response to said detected islanding operation, adjusting the rotational speed of said wind turbine to a value of low rotational speed; converting said generator output to a value suitable for charging said auxiliary power distribution system; and, connecting the output of said converter to said auxiliary power distribution system.

In yet another embodiment, the method may comprise: receiving the rotational speed of said turbine and at least a turbine parameter associated the torque and/or the pitch angle of said wind turbine; providing a target rotational speed; and, regulating said rotational speed of said turbine to said target rotational speed by adjusting said at least turbine parameter.

In one variant, the method may comprise: determining a difference between said received rotational speed with said target rotation speed; and, reducing said difference by adjusting said pitch angle of said rotor blades and/or said torque.

In one embodiment said auxiliary converter comprises a rotatable variable transformer comprising at least a first coil magnetically coupled to at least a second coil, wherein said magnetic coupling is controlled by controlling the angle between said first and second coils.

In another embodiment said rotatable variable transformer being a three-phase transformer comprising a star configured primary coil and a star configured secondary coil wherein said primary and secondary coils are rotatable mounted with respect to each other such that the magnetic coupling can be varied in dependence of a rotation angle, said method further comprising: controlling said variable transformer on the basis of the output voltage of said generator such the output of said variable transformer generates a substantially constant voltage value which is suitable for charging said auxiliary power distribution system.

In another embodiment, the method may comprise: determining the current output voltage of said generator; providing a target output voltage; controlling said rotation angle between said first and second coils on the basis of said current and target output voltage such that the voltage output of said converter is substantially equal to said target output voltage.

In another aspect the invention may relate to a turbine configured for generating auxiliary power for an auxiliary power distribution system of said wind turbine system comprising: a generator configured to provide power to a power transmission system, preferably said generator comprises one or more permanent magnets; and, an auxiliary converter for converting the output of said generator to a value suitable for charging said auxiliary power distribution system.

The invention may also relate to a wind turbine for generating power for the grid and auxiliary power for an auxiliary power distribution system in said wind turbine, said wind turbine comprising: a generator configured to provide power via a main converter to a power transmission system, preferably said generator comprises one or more permanent magnets; and, an auxiliary converter connected to the power output of said generator for converting at least part of the power generated by said generator for said auxiliary power distribution system, wherein said auxiliary power distribution system is connected to at least one uninterruptable power supply.

In an embodiment said auxiliary converter may comprise at least one transformer and an inverter and wherein the output of the converter is connected to a dc node of said uninterruptable power supply.

In an embodiment said auxiliary converter may comprise at least one transformer and an ac/ac converter and wherein the output of the ac/ac converter is connected to an ac output of said uninterruptable power supply.

In another embodiment said wind turbine may comprises a controller configured for adjusting the rotational speed of said wind turbine to a value of low rotational speed such that said generator output is suitable for charging said auxiliary power distribution system.

In yet another embodiment said wind turbine may comprise a controller configured for detecting islanding operation wherein said wind turbine is electrically disconnected from said power transmission system and for adjusting the rotational speed of said wind turbine to a value of low rotational speed values if said islanding operation is detected.

In a further embodiment said controller may be further configured for: receiving the rotational speed of said turbine and at least one turbine parameter associated the torque and/or the pitch angle of said wind turbine; providing a target rotational speed; and, regulating said rotational speed of said turbine to said target rotational speed by adjusting said at least one turbine parameter.

In one embodiment said auxiliary converter may comprise a rotatable variable transformer, comprising at least a first coil magnetically coupled to at least a second coil, wherein said magnetic coupling is controlled by controlling the angle between said first and second coils.

In another embodiment said auxiliary converter may be configured for controlling said angle between said first and second coils on the basis of a current output voltage and target output voltage such that the voltage output of said converter is substantially equal to said target output voltage.

In another aspect the invention may relate to a controller for use in a wind turbine as described above, the controller comprising means for receiving the rotational speed of said turbine and at least one turbine parameter associated the torque and/or the pitch angle of said wind turbine; means for providing a target rotational speed; and, means regulating said rotational speed of said turbine to said target rotational speed by adjusting said at least one turbine parameter.

In yet another aspect the invention may relate to a converter for use in a wind turbine as described above, said converter being configured to convert power generated by the generator of the wind turbine to a power suitable for charging an auxiliary power distribution system of said wind turbine, said auxiliary converter further comprising: a rotatable variable transformer, comprising at least a first coil magnetically coupled to at least a second coil, wherein said magnetic coupling is controlled by controlling the angle between said first and second coils.

In one embodiment said converter may further comprise a controller configured for controlling said angle between said first and second coils on the basis of a current output voltage and target output voltage such that the voltage output of said converter is substantially equal to said target output voltage.

The invention may also relate to computer program product comprising software code portions configured for, when run in the memory of a computer, executing the method steps as described above.

Aspects of the invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 3A and 3B depict schematics of a graph of the absolute value of the voltage output of a PM generator as a function of the rotational speed and a schematic of a control system according to one embodiment of the invention.

FIGS. 5A and 5B depict schematics of a converter comprising a variable transformer according to one embodiment of the invention.

DETAILED DESCRIPTION

Figure 1:
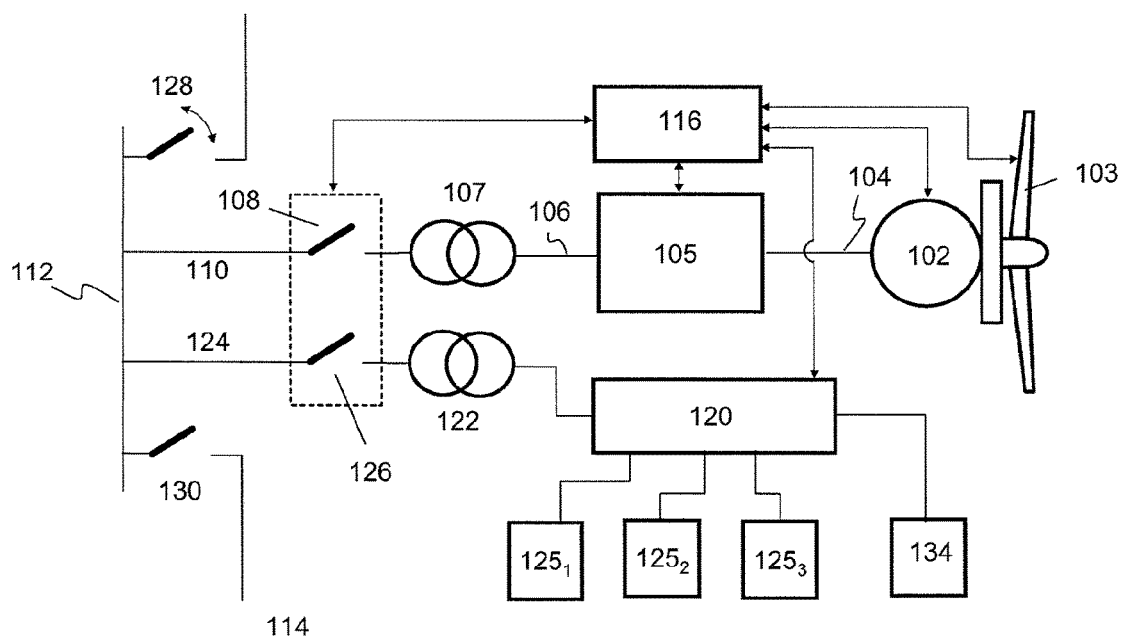
FIG. 1 depicts a schematic of a wind turbine configuration.

FIG. 1 depicts a schematic of the main components of a wind turbine 100 connected by switches to a power transmission system. Such wind turbine may be part of a wind farm (not shown) comprising a plurality of wind turbines which may be electrically interconnected using a (local) power transmission system (i.e. a local grid) comprising cables and one or more (substation) transformers for connecting the wind farm to an external power transmission system (i.e. the main power grid, typically the public power grid or a high voltage direct current (HVDC) link. The wind turbine may be connected via one or more switches, e.g. circuit breakers, to the local power grid.

The wind turbine may comprise a generator 102, e.g. a generator comprising permanent magnets (a permanent magnet (PM) type generator), which transforms the rotary energy of the blades 103 into a variable frequency ac electrical power. The ac output 104 of the generator, which is typically a three-phase ac voltage having an amplitude and a frequency depending on the rotation speed of the generator, may be fed into a (main) converter 105. Such converter may comprise an inverter for converting the ac power to a dc power and an inverter for converting the dc power into an ac power of a frequency used by the main grid. Preferably, converter relates to a self-commutated inverter well known in the art. Such self-commutated inverter is configured for generating a stable ac output signal without requiring synchronization of the output signal to an external source.

The output 106 of the convertor may be connected via a main transformer 107, a main switch 108, a main cable 110 and a common bus bar 112 to the local grid 114 (not shown). Further, a wind turbine controller 116 may control the operation of the wind turbine. The controller may collect operational data (e.g. power level, temperature, wind speed, conversion efficiency, rotational speed, torque, blade pitch, etc.) and use these operational data to control the wind turbine such that optimal operation of the wind turbine is achieved.

The wind turbine further comprises a low voltage auxiliary power distribution system 120, which is connected via an auxiliary transformer 122 and an auxiliary cable 124 to the common bus bar 112. It is submitted that bus bar configuration 110,112,124 in FIG. 1 is only one of many possible implementations for connecting the wind turbine and the auxiliary power distribution system to the grid.

The auxiliary power distribution system provides a power supply, which may be in the range of 100-500 V ac and 20-50 V dc to the electrical components in the wind turbine. These components may include the wind turbine controller, sensor elements $125_1$, blade pitching system $125_2$, yaw drive and the environmental control elements $125_3$ such as a heating and cooling systems in the wind turbine. The auxiliary power distribution system may be connected or disconnected from the local grid using a local grid switch or fuse 126. During normal operation the local grid switch may be closed so that the auxiliary power distribution system is fed by the local grid.

The auxiliary power distribution system may be connected to the local grid in various ways. In one variant (not shown) instead of a separate main and auxiliary transformer, an tertiary winding of the main transformer may used to connect the auxiliary power distribution system to the grid. In a further variant, the main switch and the local grid switch may implemented as a single switch controlled by the wind turbine controller.

If a wind turbine controller detects a power fault, it may disconnect—as a protective measure—one or more wind turbines from local grid by opening the main switch 108 and the grid switch 126 of a predetermined number of wind turbines. During disconnection, further switches e.g. secondary switches 128, 130 may be opened providing further electrical isolation of the wind turbine from the grid. Each of the of the (high voltage) switches and/or high speed circuit breakers may be controlled (opened/closed) by the wind turbine controller, wind farm controller and/or protective devices.

When the circuit breakers are opened, the wind turbine controller 116 may set the wind turbine in a standby mode by stopping the rotation of the turbine and by pitching the wind blades in the vane position. A wind turbine in the standby mode (hereafter referred to as a "deactivated" wind turbine) is disconnected from the main grid. Hence in order to ensure continuous standby operation of the wind turbine, the auxiliary power distribution system 120 may receive its power from an uninterruptable power supply (UPS) 134. Typically the UPS comprises an electrical storage system, e.g. batteries and/or super capacitors. Additionally, the UPS may comprise a diesel generator set installed in or near the wind turbine for charging the electrical storage system.

The wind turbine controller may be further configured for black-starting the wind turbine if it is in its deactivated state. Such black-start procedures are well known in the art (see for example U.S. Pat. No. 7,394,166 describing an exemplary wind turbine black start procedure). If the controller is triggered to start a black-start procedure, it may use the power provided by the UPS in order to pitch the wind blades out of the vane position and to gradually increase the power operation until stable open-circuit operation is achieved.

When the disconnected wind turbines are required to stay in the standby mode over a longer period of time, the UPS (comprising e.g. a battery system, super capacitors, a diesel generator set or combinations thereof) may run out of power. Diesel generators require maintenance and refueling and are thus less suitable for use in offshore and/or remote wind farm systems. Moreover, batteries are sensitive to temperature changes and—in order to ensure a power supply over a long duration—typically a large number of batteries is required. Hence, in general these conventional auxiliary power sources are less suitable for islanding situations, especially islanding situations in off-shore wind farms, which extend over a long period of time.

Figure 2A:
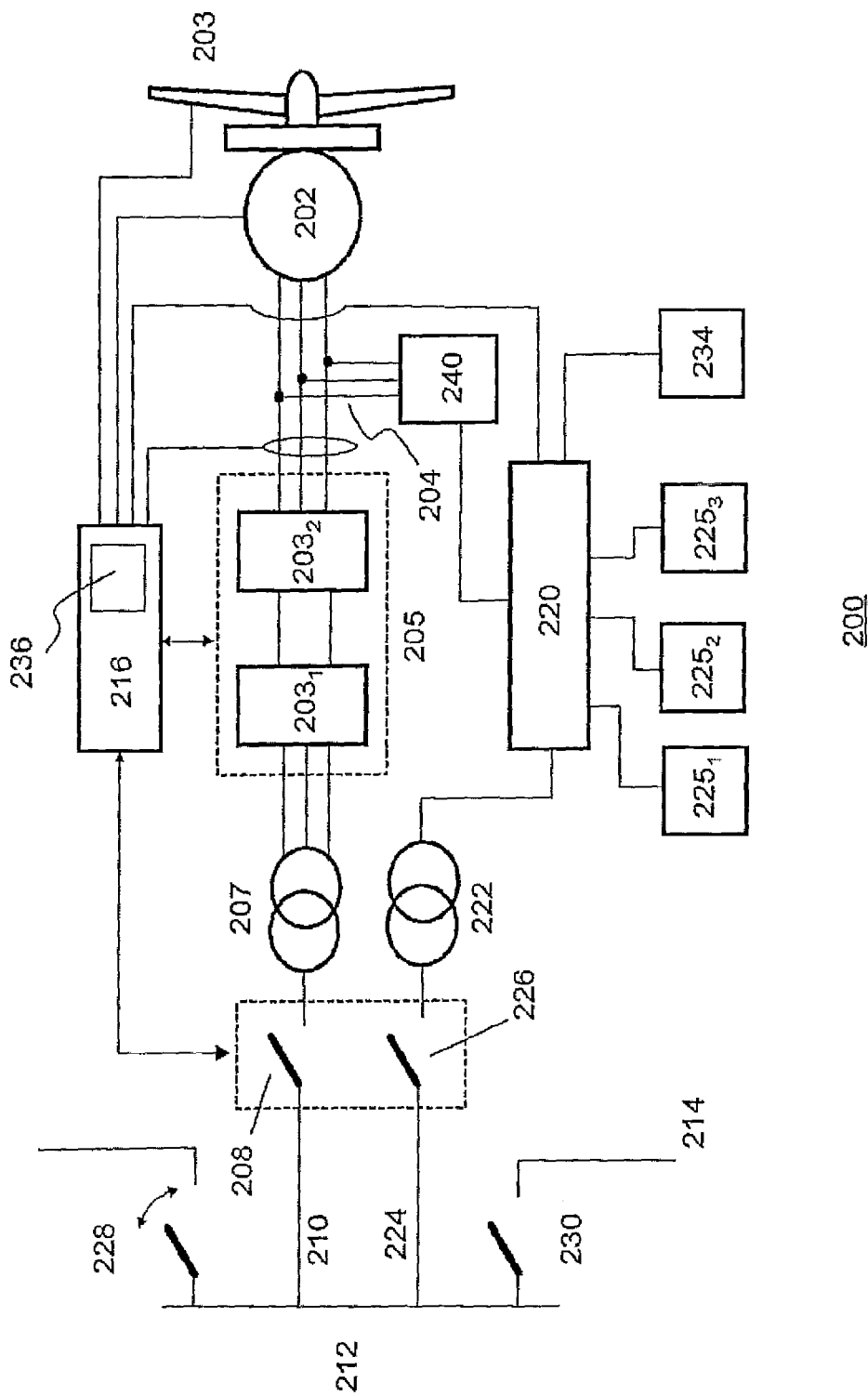
FIGS. 2A, 2B and 2C depict parts of a wind turbine according to various embodiments of the invention.

FIG. 2A depicts a schematic of a wind turbine according to one embodiment of the invention. In particular, FIG. 2A depicts a wind turbine comprising similar elements as the wind turbine described with reference to FIG. 1, i.e. a generator 202 having an output 204 connected to the main converter 205. The generator may deliver power to a main converter 205 comprising invertors $203_1$, $203_2$, which is connected via main transformer 207, a main switch 208, a main cable 210 to a common bus bar. Similarly, an auxiliary power distribution system 220 delivering power to wind turbine elements $225_{1-4}$, is connected via an auxiliary transformer 222 and an auxiliary cable 224 to the common bus bar 222.

In contrast with the conventional wind turbine scheme of FIG. 1, the wind turbine depicted in FIG. 2A is provided with an auxiliary converter 240 connected to the output 204 of the generator and to the auxiliary power distribution system. In one embodiment, the auxiliary converter is directly connected to the power output the generator, which may be a permanent magnet (PM) type generator or a synchronous type generator. During wind turbine operation, the auxiliary converter may function as an extra power delivery source for the auxiliary power distribution system.

Moreover, when the wind turbine is fully disconnected from the grid (e.g. in an islanding situation) or when the auxiliary power distribution system is disconnected from the grid (e.g. due to a system fault), the auxiliary converter may directly deliver power generated by the generator of the wind turbine to the auxiliary power distribution system.

In one embodiment, the wind turbine controller may trigger an auxiliary power control function 236 (APCF), which controllably reduces the rotational speed of the blades by for example adjusting the pitch angle of the blades. Once the rotational speed falls within a predetermined low-speed region, the auxiliary power function may keep the rotational speed within this region using a feedback loop. A constant rotational speed may be achieved by evaluating turbine parameters such as the blade pitch, the rotational speed, the generator torque and the generator voltage output. The low rotational speed region is selected such that sufficient power is generated by the generator in order charge the electrical storage system 234.

This way the auxiliary power function may control the wind turbine into a continuous low power operation wherein the rotational speed of the blades are kept within a low speed region. In this low power operation the wind turbine generates enough power for the auxiliary power distribution system without requiring the use of an UPS 234 or draining the electrical storage system of the UPS.

In one embodiment, the auxiliary power control function may be triggered if an islanding situation is detected. In another embodiment, the auxiliary power control function may be triggered if a fault, e.g. a defective turbine element, is detected. In the latter case, it may not be necessary to physically, disconnect the wind turbine from the grid.

Figure 2B:
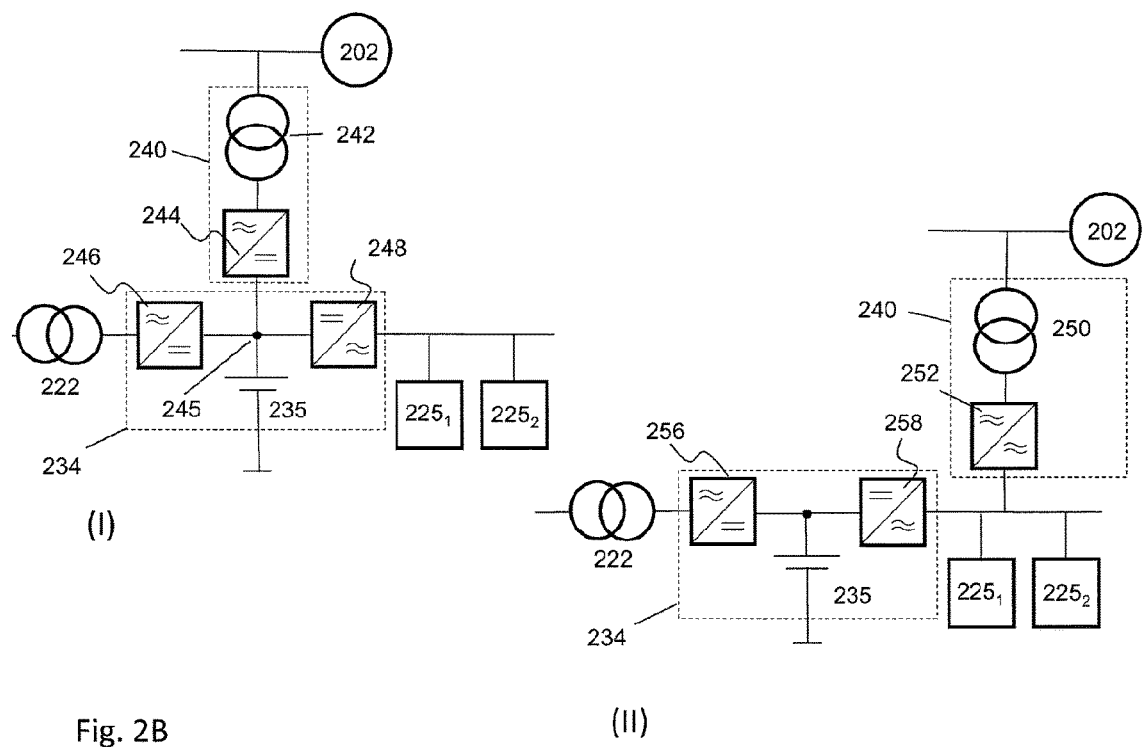
Figure 2C:
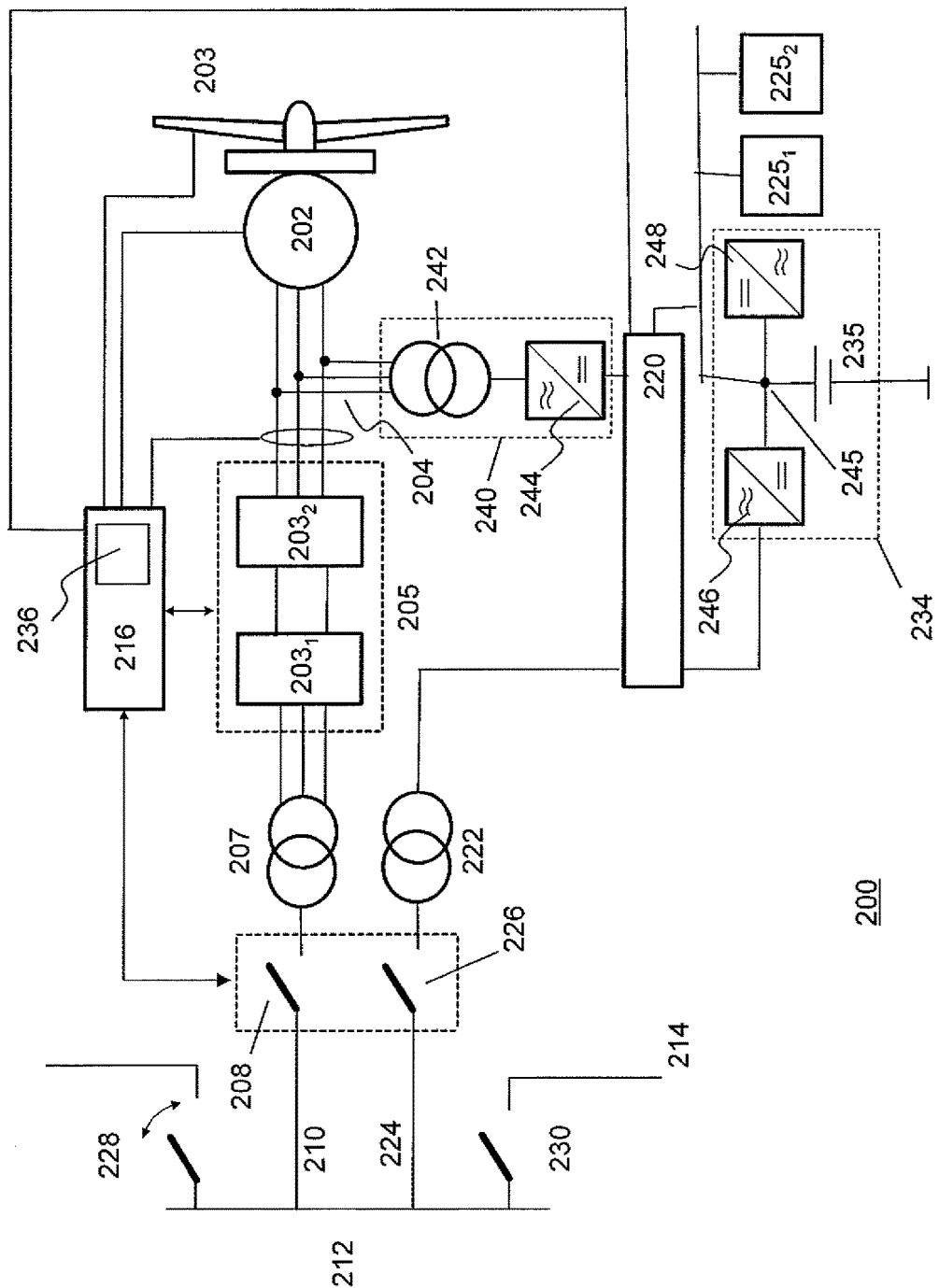

FIGS. 2B-I and 2B-II depict schematics of auxiliary power distribution systems according various embodiments of the invention. In particular, FIG. 2B-I depicts a first embodiment of an auxiliary power distribution system comprising an uninterruptable power supply (UPS) 234 connected to the auxiliary converter 240. FIG. 2C is a combination of FIGS. 2A and 2B-I.

The UPS may comprise an electrical storage system 235, e.g. a set of batteries and/or (super)capacitors connected to a first inverter 246 and second inverter 248, each having at least an ac node and a dc node. The electrical storage system and the dc node of the first inverter 246 and the second inverter 248 are connected to a common node 245.

The ac node of the first inverter may be further connected to an auxiliary transformer 222, which may be connected to the local grid in a similar manner as described with reference to FIG. 2A. The ac node of the second inverter may be regarded as the output 249 of the auxiliary power distribution system. A number of electrical loads, e.g. the wind turbine elements as described with reference to FIG. 2A, may be connected to the output.

Further, the output of the generator is coupled via the auxiliary converter 240 to the common node. In one embodiment, the converter may comprise a transformer 242 and an inverter 244 having its dc node connected to the common node of the UPS. Hence, in this embodiment the UPS is both fed by power from the grid and the generator. This auxiliary converter configuration only requires a small number of ac-dc conversions in order to provide a reliable and continuous operation of the auxiliary power distribution system. Moreover, it allows to downscale the electrical components used in auxiliary power distribution system. For example, the auxiliary converter may allow to use a smaller inverter 246 (compared to the conventional situation without the auxiliary converter).

FIG. 2B-II depicts a second embodiment comprising a UPS 234 similar to the one described in FIG. 2B-I. Again the ac node of first inverter 256 of the UPS is connected via an auxiliary transformer 222 to the local grid and the output 249 of the UPS is connected to one or more electrical loads.

Further, the output of the generator is coupled via the auxiliary converter 240 to the common node. In this case, the converter may comprise a transformer 250 connected to an ac/ac converter 252 for converting the ac voltage originating from the transformer into ac voltage of a predetermined frequency and amplitude. Typically, the ac/ac converter 252 have a similar configuration as the UPS 234 comprising electrical storage system, e.g. a set of batteries and/or (super)capacitors connected to a first inverter and second inverter. Hence, in this embodiment, the auxiliary converter 240 has its own independent UPS connected to the UPS which is connected to the grid.

Only if the wind conditions do not allow slow speed operation the wind turbine controller may decide to use the UPS. The control functionality provided by the auxiliary power control function and its advantageous uses will be described in more detail with reference to FIGS. 3A and 3B.

FIG. 3A depicts a graph of the direct voltage output of a PM generator as a function of the rotational speed and a schematic of a control system according to one embodiment of the invention. In particular, the graph of FIG. 3A depicts the (quasi) linear graph 302 representing the absolute value of the voltage output $|V|$ of a PM generator as a function of the rotational speed $\omega$. In normal operation, the rotational speed of the generator will be within a first range 304 denoted by rotational speeds $\omega_1$ and $\omega_2$ and corresponding output voltages $|V_1|$ and $|V_2|$. When it is required to the auxiliary power control function will then regulate the rotational speed back to a second range 306 of relative low rotational speeds denoted by rotational speeds $\omega'_1$ and $\omega'_2$ and corresponding output voltages $|V'_1|$ and $|V'_2|$. This second range is selected such that the power output is sufficient for powering the auxiliary power distribution system.

The voltage dependence as shown in FIG. 3A is used by the auxiliary power supply function 336 (APSF) as depicted in FIG. 3B. The APSF may receive a trigger signal $T_{io}$ 308 indicating that the wind turbine requires a low power operation as described e.g. with reference to FIG. 2A.

In that case, the APSF 336 collects current wind turbine parameters such as the rotational speed ω and generator torque 310, the blade pitch θ 312 and the output voltage |V| 314. These values are compared with pre-determined set-point values $\omega_{sp}$ and $|V_{sp}|$ 316 in the low speed rotational range. If a difference between the current values and the set-point values is determined, the APSF 336 iteratively regulates the rotational speed down to the set-point value by pitching 318 the blades and/or adjusting the generator torque such that the desired rotational speed is reached.

Figure 4:
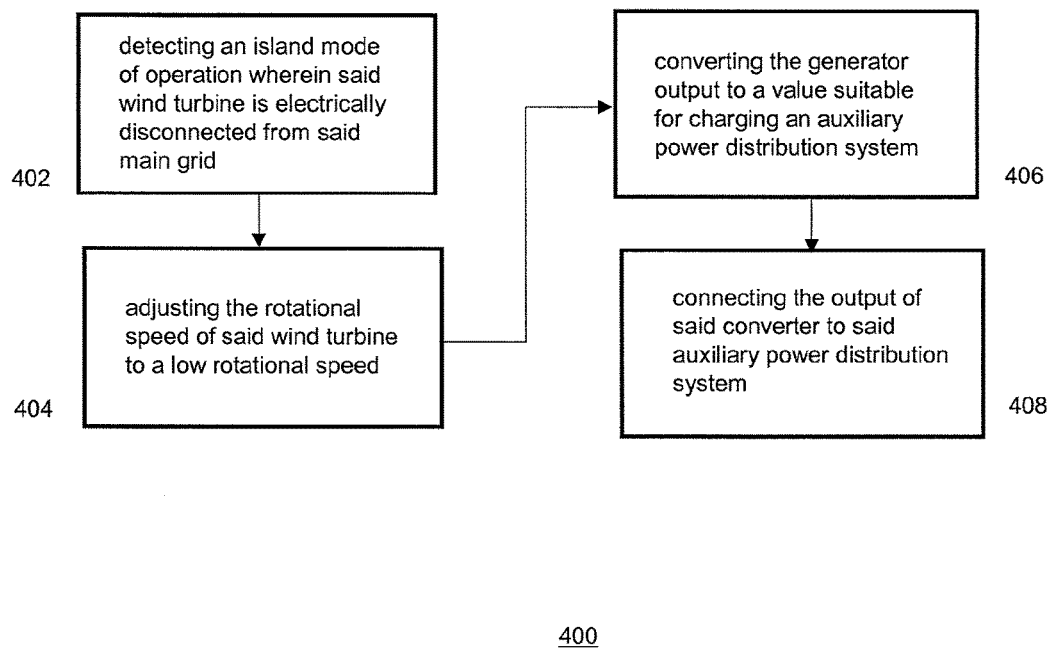
FIG. 4 depicts a schematic of a process according to various embodiments of the invention

FIG. 4 depicts a schematic of a process 400 according to one embodiment of the invention. In particular, FIG. 4 depicts a process executed by the auxiliary power supply function as depicted in FIG. 3B. In a first step 402, an island mode of operation is detected wherein the wind turbine is electrically disconnected from the grid. In that case, the APSF 336 is triggered to receive wind turbine parameters and to adjust on the basis of the wind turbine parameters the rotation speed of the wind turbine back to a set-point value in a low rotational speed range (step 404). When a low rotational steady state is reached, the ac voltage output of the generator is converted to a dc voltage (step 406), which is suitable for powering the auxiliary power distribution system. In that case, the converter output is connected to the auxiliary power distribution system (step 408).

The ac voltage output signal of the PM generator is a three-phase signal wherein both its frequency and the amplitude depend on the rotational speed of the turbine. Down or up conversion of this rather complex ac generator output signal may be realized by an electrical convertor comprising two inverters. Such wide range convertors however are relatively large and complicated electrical devices, which are sensitive to defects, which—especially in the context of islanding situations—are not desirable features.

FIGS. 5A and 5B depict schematics of an auxiliary converter according to a further embodiment of the invention. In particular FIG. 5A depicts an auxiliary convertor comprising an electromechanical variable voltage transformer 502 connected to an AC-DC conversion circuit 504. FIG. 5B depicts one embodiment of such electro-mechanical variable transformer. Such transformer may comprise a primary coil element 506 and secondary coil element 508 (schematically illustrated), which both implemented in a star configuration wherein each coil element 506, 568 comprises three legs. The primary and secondary coil elements are rotatably mounted with respect to each other such that in a first position (angle Φ between the legs of the primary and secondary coil elements is approximately zero) the magnetic coupling between the legs of the primary and secondary coil elements is maximal.

In that case the voltage U induced in the secondary coil may be approximately equal to the voltage V applied to the primary coil. In a second position (angle Φ between the legs of the primary and secondary coil elements is approximately sixty degrees) the magnetic coupling between the primary and secondary coils may be minimal so that the voltage induced in the secondary coil is much smaller than the voltage applied to the primary coil: U<<V. Hence, such a three-phase transformer configuration defines a variable three-phase transformer wherein the magnetic coupling may be adjusted by adjusting the angle between the primary and secondary coils.

Such three-phase variable transformer may be used in the converter scheme as depicted in FIG. 5A. The transformer 502 is configured to transform the ac generator voltage V at the output of the generator down to a three phase voltage signal which is suitable for conversion to a DC value $U_{aux}$ for use by the auxiliary power distribution. Inevitable fluctuations in the rotational speed may be eliminated or at least reduced by convertor controller 510, which monitors both the voltage over the input 512 and the output 514 of the transformer 502. If large deviations from the predetermined down conversion is detected, the convertor controller 510 counteracts this deviation by adjusting the angle Φ between the primary and secondary coil elements.

This way a stable down conversion of the three-phase voltage signal may be achieved. The down converted voltage is subsequently transformer 502 in a DC voltage using technique well known in the art, e.g. a full-wave bridge rectifier circuit. Hence, the converter scheme depicted in FIG. 5A includes an electro-mechanical transformed which allows simple and efficient conversion of the AC generator output into a DV voltage for use by the auxiliary power distribution system. Furthermore, the electro-mechanical transformer 502 provides a robust mechanical variant of the conventional full electric variable converters. Moreover, it provides transformation and the necessary isolation between the high voltage side of the turbine and the low voltage side of the auxiliary power distribution system.

It is also to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Furthermore, equivalents and modifications not described above may also be employed without departing from the scope of the invention, which is defined in the accompanying claims.

The invention claimed is:

1. A method of generating auxiliary power for a wind turbine, said wind turbine comprising a generator, a main converter, an auxiliary converter and an uninterruptable power supply, wherein an output of the auxiliary converter is connected to a DC node of said uninterruptible power supply, and wherein said generator is configured to provide power via said main converter to a power transmission system, and wherein the auxiliary converter is connected to a power output of said generator and comprises a first converter configured to convert AC to DC power, and wherein the uninterruptible power supply comprises an electrical storage system, a second converter configured to convert AC to DC power and an inverter, said method comprising:

converting at least part of the power generated by said generator using the auxiliary converter; and supplying the power converted by said auxiliary converter to an AC auxiliary power distribution system of the wind turbine, wherein said AC auxiliary power distribution system is connected to at least one AC output of the uninterruptible power supply.

2. The method according to claim 1 and further comprising:
adjusting a rotational speed of said wind turbine to a value of low rotational speed; and
converting said power output of said generator for said auxiliary power distribution system.

3. The method according to claim 1 and further comprising:
detecting that said wind turbine is electrically disconnected from said power transmission system;
in response to said detected disconnection, adjusting a rotational speed of said wind turbine to a value of low rotational speed;
converting said power output of said generator for said auxiliary power distribution system; and,
connecting the output of said auxiliary converter to said auxiliary power distribution system.

4. The method according to claim 3 and further comprising:
receiving the rotational speed of said wind turbine and at least a turbine parameter associated torque and/or pitch angle of rotor blades of the wind turbine;
providing a target rotational speed; and
regulating said rotational speed of said turbine to said target rotational speed by adjusting said at least turbine parameter.

5. The method according to claim 4 and further comprising:
determining a difference between said received rotational speed with said target rotational speed; and,
reducing said difference by adjusting said pitch angle of said rotor blades and/or said torque.

6. The method according to claim 1, wherein said auxiliary converter comprises a rotatable variable transformer comprising at least a first coil magnetically coupled to at least a second coil, and wherein said magnetic coupling is controlled by controlling a rotation angle between said first and second coils.

7. The method according to claim 6, said rotatable variable transformer being a three-phase transformer comprising a star configured primary coil and a star configured secondary coil wherein said primary and secondary coils are rotatable mounted with respect to each other such that the magnetic coupling can be varied in dependence of a rotation angle.

8. The method according to claim 6 and further comprising:
determining a current output voltage of said generator;
providing a target output voltage; and
controlling said rotation angle between said first and second coils based on said current and target output voltage such that an output voltage of said converter is substantially equal to said target output voltage.

9. A wind turbine for generating power for a power grid and for generating auxiliary power for an AC auxiliary power distribution system in said wind turbine, said wind turbine comprising:
a generator configured to provide power via a main converter to a power transmission system; and
an auxiliary converter comprising a first converter configured to convert AC to DC power, the auxiliary converter being connected to a power output of said generator and configured to convert at least part of the power generated by said generator for said AC auxiliary power distribution system,
an uninterruptible power supply comprising an electrical storage system, a second converter configured to convert AC to DC power and an inverter, wherein said AC auxiliary power distribution system is connected to at least one AC output of the uninterruptible power supply, and wherein an output of the auxiliary converter is connected to a DC node of said uninterruptible power supply.

10. The wind turbine according to claim 9 wherein said wind turbine comprises a controller configured to adjust a rotational speed of said wind turbine to a value of low rotational speed such that power from said power output is suitable for charging said auxiliary power distribution system.

11. The wind turbine according to claim 9 wherein said wind turbine comprises a controller configured to detect islanding operation wherein said wind turbine is electrically disconnected from said power transmission system and to adjust a rotational speed of said wind turbine to a value of low rotational speed values if said islanding operation is detected.

12. The wind turbine according to claim 9, wherein said auxiliary converter comprises a rotatable variable transformer, comprising at least a first coil magnetically coupled to at least a second coil, wherein said magnetic coupling is controlled by controlling an angle between said first and second coils.

13. The wind turbine of claim 9 and further comprising a controller having:
means for receiving a rotational speed of said turbine and at least one turbine parameter associated a torque and/or a pitch angle of said wind turbine;
means for providing a target rotational speed; and,
means regulating said rotational speed of said turbine to said target rotational speed by adjusting said at least one turbine parameter.

14. The wind turbine according to claim 9, and further comprising a converter configured to convert power generated by the generator of the wind turbine for an auxiliary power distribution system in said wind turbine, said auxiliary converter further comprising:
a rotatable variable transformer, comprising at least a first coil magnetically coupled to at least a second coil, wherein said magnetic coupling is controlled by controlling an angle between said first and second coils.

15. The method according to claim 7, and further comprising:
controlling said variable transformer based an output voltage of said generator such the output of said variable transformer generates a substantially constant voltage value which is suitable for charging said auxiliary power distribution system.

16. The wind turbine according to claim 11 wherein said controller is configured to:
receive a rotational speed of said turbine and at least one turbine parameter associated a torque and/or a pitch angle of said wind turbine;
provide a target rotational speed; and,
regulate said rotational speed of said turbine to said target rotational speed by adjusting said at least one turbine parameter.

17. The wind turbine according to claim 12, wherein said auxiliary converter is configured to control said angle between said first and second coils on the basis of a current output voltage and a target output voltage such that an output voltage of said auxiliary converter is substantially equal to said target output voltage.

18. The wind turbine according to claim 14, and further comprising:
   a controller configured to control said angle between said first and second coils on the basis of a current output voltage and target output voltage such that an output voltage of said converter is substantially equal to said target output voltage.

\* \* \* \* \*